United States Patent
Nguyen et al.

(10) Patent No.: US 11,620,460 B1
(45) Date of Patent: Apr. 4, 2023

(54) METHOD AND SYSTEM FOR ISSUING AND STORING KEY/KEYCARD

(71) Applicant: Tung Mai Le, Sydney (AU)

(72) Inventors: Quoc Anh Do Nguyen, Gia Lai (VN); Tung Mai Le, Sydney (AU)

(73) Assignee: Tung Mai Le, Edensor Park (AU)

( * ) Notice: Subject to any disclaimer, the term of this patent is extended or adjusted under 35 U.S.C. 154(b) by 0 days.

(21) Appl. No.: 17/938,051

(22) Filed: Oct. 5, 2022

(51) Int. Cl.
G06K 7/10 (2006.01)
G07C 9/00 (2020.01)
G06K 7/14 (2006.01)

(52) U.S. Cl.
CPC ....... G06K 7/10227 (2013.01); G06K 7/1417 (2013.01); G07C 9/00571 (2013.01); G07C 9/00857 (2013.01)

(58) Field of Classification Search
CPC ............. G06K 7/10227; G06K 7/1417; G07C 9/00571; G07C 9/00857
See application file for complete search history.

(56) References Cited

U.S. PATENT DOCUMENTS

2004/0046018 A1* 3/2004 Dobbins .................. G07C 9/38
235/382.5

* cited by examiner

Primary Examiner — Matthew Mikels

(57) ABSTRACT

A novel system and method to facilitate an issuing and storing key/keycard system includes a network, a cloud server, a terminal, a cabinet control server, and at least an issuing and storing key/keycard cabinet. The customer/ the user, through the terminal, can sign up/ receive authentication methods to verify user rights/owner of key/keycard to the cloud server. The issuing and storing key/keycard cabinet is used in issuing and storing the customer/user's key/keycard. The cabinet control server controls and operates the issuing and storing key/keycard cabinet. The invention is to provide a method of issuing and storing key/keycard includes steps: i) the customer/user register/verify user rights/owner of key/keycard to the cloud server; ii) the customer/user takes/stores key/keycards at the issuing and storing key/keycard cabinet; iii) synchronization data between the cloud server with the cabinet control server.

19 Claims, 4 Drawing Sheets

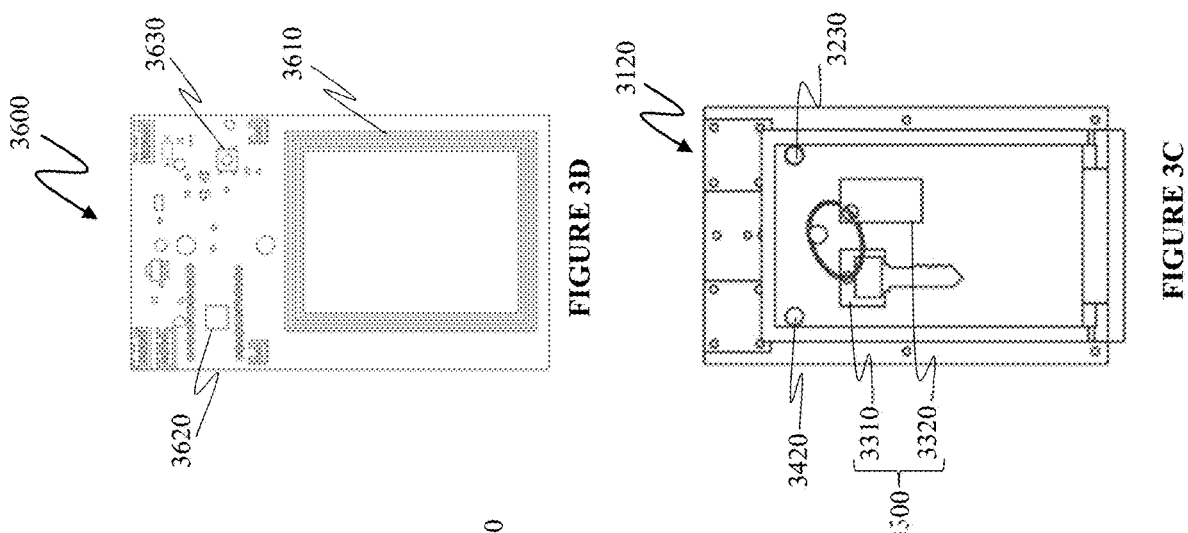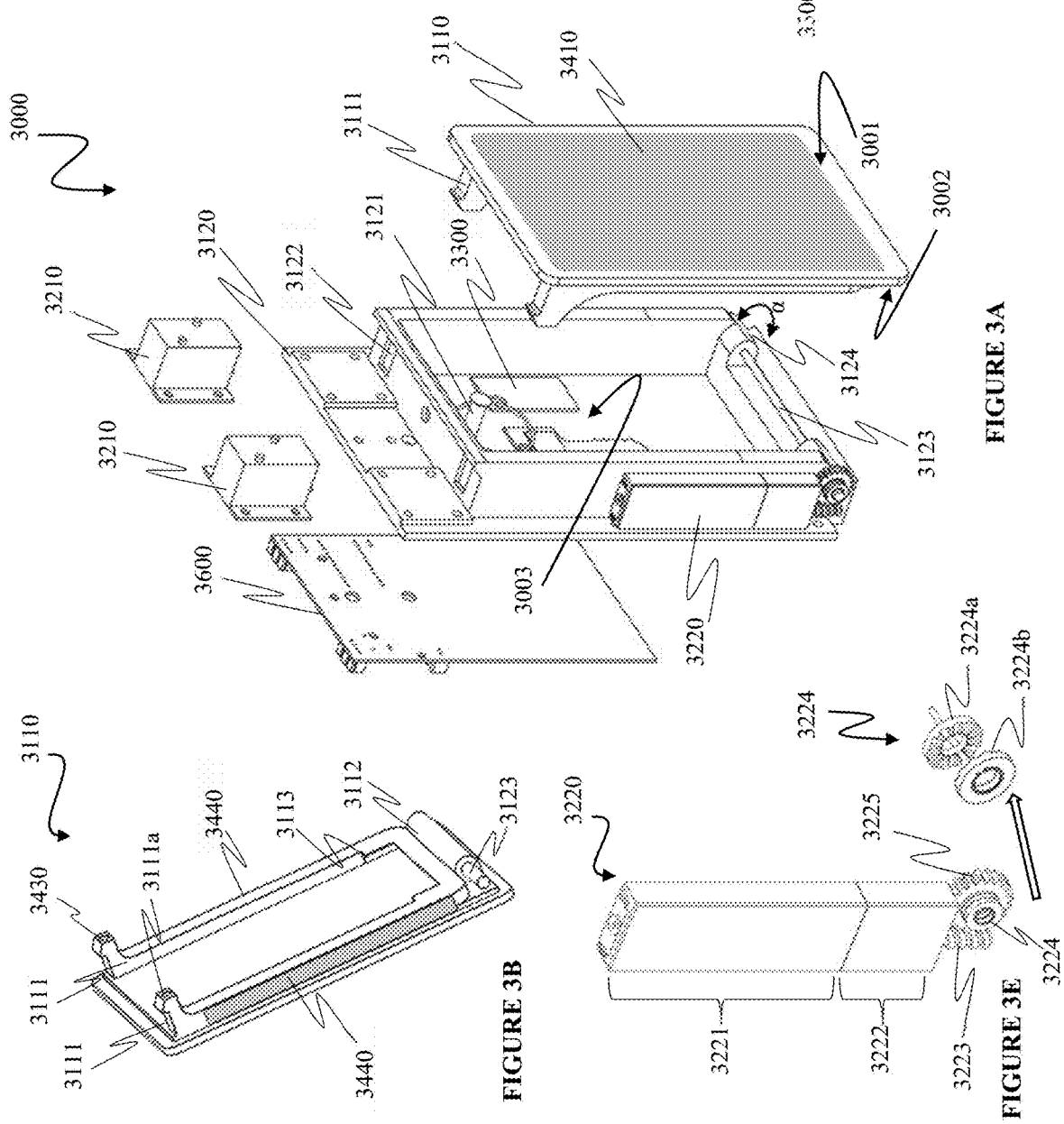

METHOD AND SYSTEM FOR ISSUING AND STORING KEY/KEYCARD

FIELD OF THE INVENTION

The invention relates to the technical field of item storage, particularly allocating and storing key/keycard with special anti-theft functions. In particular, the invention refers to a system and method issuing and storing key/keycard multiple methods to verify user rights/owner of key/keycard combined with random location storage for key/keycard. It helps simplify the issuing and storing key/keycard in hotels/restaurants and reduces costs and security risks.

BACKGROUND ART

The issuing and storage of key/keycard in most hotels/restaurants or rental apartments mainly apply manual management; In particular, keys are hung/hooked on shelves/cabinets and strung together, and the user or administrator obtains the key/keycard according to a fixed numbering convention to identify the key/keycard. The disadvantages of this method are: consuming a lot of time and cost of key/keycard management, usage status of key/keycard, who is the user of key/keycard, key/keycard being returned or not, the key/keycard securely stored and other risks. As a result, key/keycard cannot be reliably and efficiently managed.

Currently, there have been many inventions to improve the issuing and storage of key/keycard more securely, reducing time and costs such as:

Patent application CN112907791A discloses an intelligent key cabinet system based on RFID accurate recognition and face recognition technologies. The cabinet has several compartments to provide separate storage space for each key. The cabinet includes a screen display and an image acquisition camera; the control unit is used to issue/return the key according to the preset key management mechanism/Authorization modification operation. Further, the smart key cabinet system embodiments an RFID electronic ID card for each key. Collect the user's facial feature data and posture feature data, and compare the collected facial features with the personnel standard features corresponding to the scheduling information issued by the host computer to determine whether it is a legitimate user.

Patent application CN210295229U discloses a unit intelligent key cabinet, which comprises a main cabinet body, an auxiliary cabinet body is arranged on the right side of the main cabinet body, and a touch screen is placed on the left side of the surface of the main cabinet body. A face recognition device is arranged on the right side of the touch screen and located on the surface of the main cabinet body. The utility model can carry out authorization authentication in various ways through a touch screen, a face recognition device, a two-dimensional code scanning device, an RFID recognition device, and a fingerprint device. The user can choose and configure it according to the actual situation.

Patent application CN215347778U discloses an intelligent key cabinet with a touch screen, a fingerprint identification device, and an IC card identification device and supports face identification, fingerprint identification, password verification, and IC card identification. The lock control device can identify the key RFID label information and safely lock the key label. The lock control device supports locking functions when the key label is inserted and displays the license plate in real-time, and supports locking and binding the key 1 to the key 1. The lock control fixing plate is slightly inclined by 2-5 degrees so that the key can be conveniently inserted, and the key is prevented from being unlocked and sliding off.

CN patent 2,0232,4985U relates to intelligent key cabinet. The utility model discloses an intelligent key cabinet. The intelligent key cabinet comprises a cabinet body and a door plate and also comprises a system, an electric lock A, a fingerprint acquisition instrument, a touch liquid crystal display screen and a keyboard, wherein the door plate is movably connected with the cabinet body; the system is arranged in the cabinet body; the electric lock A is arranged between the cabinet body and the door plate; the fingerprint acquisition instrument and the touch liquid crystal display screen are arranged on the cabinet body and are connected with the system; the keyboard is arranged on the door plate, is connected with the system and is used for inputting passwords to unlock a password lock; a plurality of drawers are arranged in the cabinet body; an electric lock B which is controlled by a locking control plate of the system is arranged on the inner back of the cabinet body; and the rear side of each drawer is provided with a latch which is clamped with the electric lock B. The intelligent key cabinet has the advantages that all-stainless-steel panels and a national antitheft-level safety cabinet body are selected, the control for the cabinet body can be realized only by fingerprints, and the fingerprint storage capacity is up to 8000 pieces; when articles are stored, each step of operation is recorded and stored by the system; and the intelligent key cabinet also can be connected with a network by the system, and can inquire the personnel operation records and personnel management functions by the network.

CN patent 1,052,61103A discusses intelligent assess control system. The invention belongs to the field of smart home and particularly relates to an intelligent assess control system. The intelligent assess control system comprises a controller, a fingerprint sensor, a camera, an input device, a communication unit, a display unit and a power source; the controller is responsible for information processing, the camera is used for unlocking through face identification, the fingerprint sensor is used for unlocking through fingerprints, and the input device is used for unlocking by inputting a password; a user mobile phone terminal is in interaction with the intelligent access control system through the communication unit. According to the intelligent assess control system, four types of unlocking modes are provided, and home security is greatly improved.

A CN patent 1,052,61093A discusses intelligent key cabinet based on tough screen and PLC. The invention provides an intelligent key cabinet based on a tough screen and a PLC, and relates to an intelligent and secure management device. The intelligent key cabinet comprises a key cabinet box, the touch screen, a PLC host, a plurality of key cabinet bodies and a plurality of key tables. The key cabinet bodies are evenly distributed in the key cabinet box, each key cabinet body is provided with a cabinet door, the cabinet doors are locked on the key cabinet bodies through electrical locks respectively, the key tables are arranged in the key cabinet bodies respectively, and the PLC host is connected with the touch screen. Each key table comprises a key box and an identity box. Each key box and each identity box each comprise a key inlet/outlet and an identity card inlet/outlet. Each key box and each identity box are each internally provided with a microswitch and a push-pull electromagnet. The microswitches of the key boxes and the push-pull electromagnets are connected with the microswitches and the push-pull electromagnets of the identity boxes through wires. Great convenience is provided for life of people. Dual protection of keys of users is achieved through the key cabinet bodies and the key tables, and security is improved.

A CN patent 2,089,38185UA relates to kind of smart lock of hotel system. The utility model belongs to Intelligent life technical field, and in particular to a kind of smart lock suitable for hotel system. It is made of main control computer, smart lock and mobile terminal, information collection recording module, secret generation module, information sending module and command reception module is equipped in the main control computer; Information receiving module, password match module, instruction sending module and lock body are equipped in the smart lock; The utility model is overcome traditional hotel and is unlocked using magnetic card, and the defect that magnetic card is easily lost, and ensure that the property safety for moving in customer, to provide convenience to user; Random cipher can be generated for customer's unlatching room door by the way that secret generation module is arranged, and the password is eliminated by system automatically after customer completes check-out, so that the safety in guest room is higher.

It can be seen that the above technical solutions reduce time and improve the security of key/keycard issuance. However, the inventions mentioned above are not flexible in the authentication of user rights/owner of key/keycard. In addition, it does not have safety designs, anti-reading magnetic cards/RFID tags, and automatic closing of cabinets/ key/keycard boxes to reduce security risks. The above inventions are limited to the expansion/addition of the key/keycard box.

Therefore, finding better ways to have a key/keycard issuance and storage system with multiple authentication mechanisms for user rights/owner of key/keycard is necessary. It also aims to provide a key/keycard issuance and storage system designed in the key/keycard storage unit to be convenient and flexible for customers/users while also preventing information recorded on the RFID magnetic card/RFID tag from being penetrated illegally. The key/ keycard issuance and storage system have an automatic locking mechanism for drawers/parts that store the key/ keycard to reduce security risks. The issuing and storing of key/keycard system could be easily expanded/added to key/keycard boxes, optimizing installation and operating costs and has a method that not only issues and stores key/keycard but can also store many other personal belongings.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

SUMMARY OF THE INVENTION

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

It is the general object of this invention to provide a new and improved application with multiple facilities for the users are provided in single application.

The primary purpose of the invention is to provide an issuing and storing key/keycard system, including a network, a cloud server, at least a terminal, a cabinet control server, and at least an issuing and storing key/keycard cabinet;

wherein the cloud server, the terminal, and the cabinet control server are connected to the network together through the internet communication channel;

wherein the issuing and storing key/keycard cabinet and the cabinet control server are connected by a local network channel;

wherein the local network channel includes wired communications such as Ethernet, RS-232, RS-485, and USB; wireless communications such as ZigBee™/IEEE 802.15.4, Bluetooth™, Z-wave, NFC, Wi-fi/802.11, IEEE 802.15.4, IEEE 802.22, ISA100a, wireless USB, LoRa, LiFi, Wi-fi, Hotspot, UHF/VHF Radio Frequencies;

wherein the customer/the user, through the terminal, can sign up/receive authentication methods to verify user rights/ owner of key/keycard to the cloud server;

wherein authentication methods include: biometric, QR code, hotel/restaurant reservation code, email address/mobile number combined with a password, third party account such as Google, Facebook, Twitter;

wherein the terminal of the customer/the user includes a personal digital assistant (PDA), mobile phone, iPad, or personal computer;

wherein the issuing and storing key/keycard cabinet used in the issuance and storage of key/keycard of the customer/ user who has user rights/owner of key/keycard;

wherein the cloud server used in storing information of the customer/user and synchronizing partial/total information to the cabinet control server to the customer/user receive/store key/keycard correctly at the issuing and storing key/keycard cabinet by one or multiple methods of authentication;

wherein the cabinet control server is used in controlling and using the issuing and storing key/keycard cabinet through the local area network, at the same time, synchronizing partial/total information to the cloud server through the internet communication channel;

wherein the cloud server also includes a Web/App management application so the customer/user can sign-up/login to verify user rights/owner of key/keycard;

accordingly, the issuing and storing key/keycard system also includes the following embodiments:

according to the first embodiment, wherein the cloud server also includes a data center used in keeping the information of the customer/user of the whole system;

wherein the data center includes a biometric data center, identification user rights/owner of key/keycard data center, and departure data center of the customer/user;

wherein the Web/App management application also includes the synchronized data statement to the cabinet control server, and the synchronized data includes identification user rights/owner of key/keycard data center and departure data center;

wherein the Web/App management application also includes the verifying user rights/owner of key/keycard statement is sent to the cabinet control server reply on biometric data center if the verifying user rights/owner of key/keycard statement is the requested statement by biometric such as the face, retina/iris, fingerprint;

according to the second embodiment, wherein the issuing and storing key/keycard cabinet includes the first power supply, the screen, the mechanical keyboard, the biometric identification unit, the key/keycard drawers;

wherein the first power supply is used in electrically connecting to the key/keycard drawer, the screen, the mechanical keyboard, and the biometric identification unit;

wherein the key/keycard drawer is a sealed box used in storing key/keycard, and the key/keycard drawer is closed/opened by a statement from the cabinet control server through the local network channel;

wherein the screen, the mechanical keyboard, and the biometric identification unit are used in receiving the verification information user rights/owner of the key/keycard from the customer/user; the identifying information is transmitted to the cabinet control server through the local connection channel;

wherein the cabinet control server will identify information of the user rights/owner of key/keycard to send statements to open the key/keycard drawer through the local network channel;

wherein the local connection channel includes electrical connection and/or magnetic connection, and/or mechanical connection;

according to the third embodiment, wherein the key/keycard drawer includes a key/keycard box, a mechanical lock module, a key/keycard owner authentication unit, a security unit, an auxiliary equipment unit, and a control circuit; all of them are connected by the local connection channel;

wherein the control circuit includes a microcontroller unit, an RFID card reader circuit, and a transmission protocol port;

wherein the RFID card reader circuit used in the microcontroller unit reading identifying information user rights/owner of the key/keycard owner authentication unit;

wherein the transmission protocol port is used in connected the issuing and storing key/keycard cabinet to the cabinet control server through the local network channel;

wherein the micro-controller unit sends a statement controlling the mechanical locking unit, the key/keycard owner authentication unit, the security unit, and the auxiliary equipment unit through the local connection channel; the difference is that the microcontroller unit also records response from the security unit and the auxiliary equipment unit for to send a warning message/notification message to the control server;

wherein the mechanical locking unit includes mechanical key devices used in opening/closing the key/keycard box, such as stainless-steel deadbolts, an electric motor, and an electromagnetic lock;

wherein the key/keycard owner authentication unit is devices/electromagnetic cards used in storing identifying information user rights/owner of key/keycard and using electromagnetic technology to retrieve information;

wherein the security unit includes devices such as a camera, sensors, and/or IoT devices used in recording and notifying opening/closing status of the key/keycard box or illegal activities;

wherein the auxiliary equipment unit also includes devices handling states related to the surroundings, such as lights and pressure sensors;

according to the fourth embodiment, wherein the key/keycard owner authentication unit includes the mechanical key with an RFID tag card, the mechanical key and the RFID tag card, and the magnetic RFID tag card;

according to the fifth embodiment, wherein the cabinet control server includes a data storage and a key/keycard management module;

wherein the data storage includes a key/keycard owner's identification data and a departure data;

wherein the key/keycard management module includes an identifying owner of the key/keycard module, a security warning module, a setting transmission protocol module, and the module synchronizing data to the cloud server;

wherein the identifying owner of the key/keycard module receives information about the customer/user from the screen or the mechanical keyboard or the biometric identification unit at the I/O interface to communicate with peripherals such as camera, camera 3D;

wherein the received information includes biometric information such as face or fingerprint; the received information also includes email/phone number and password or reservation code or QR code or combining two or more of these authentication factors for to create two-factor authentication or three-factor authentication;

wherein the second security warning module will send a warning sound statement to the audio interface in case the identifying information owner of the key/keycard is incorrect, or there is unauthorized access to the issuing and storing key/keycard;

wherein the module synchronizing data to the cloud server is used in synchronizing partial or full from the cabinet control server to the cloud server; data synchronization includes the key/keycard owner's identification data, the departure data of the cabinet control server with the key/keycard owner's identification data center, the departure data center of the cloud server;

according to the sixth embodiment, wherein the issuing and storing key/keycard cabinet includes adding a frame rack used in mechanically connecting to the first power supply, the screen, the mechanical keyboard, and the key/keycard drawers;

according to the seventh embodiment, wherein the key/keycard box has a shape rectangular/square and includes a box lid, a frame holder, a light supply, and two deadbolts;

wherein the box lid, the light supply, and two deadbolts are mechanically connected to the frame holder;

wherein the light supply and the deadbolt are electrically connected to the control circuit;

wherein the light supply belongs to the auxiliary equipment unit and the deadbolt belongs to the mechanical locking unit;

wherein the internal box lid, the opposite of the deadbolt, also includes adding two tumblers have shape hook up; at the first position on the two tumblers are attached a first permanent magnet and a second permanent magnet;

wherein the deadbolt is used to protect the tumbler from being hacked/infiltrated by an external agent; in addition, the deadbolt is also used to hold/release the tumbler, used for opening/closing the box lid; The difference is the microcontroller of the control circuit will request the deadbolt to release the tumbler to open the box lid;

wherein the internal box lid, at the bottom position, also includes adding a drive shaft used in mechanically linking with the frame holder at a link rod of the frame holder;

wherein the internal box lid also includes the sliding tray used in storing the key/keycard owner authentication unit in the form of an RFID tag card, which prevents the RFID tag card from slipping out of the key/keycard box; the difference is the sliding tray has a U shape, hollow inside to facilitate the operation of taking/storing the RFID tag card to the sliding tray;

wherein the frame holder also includes adding a key/keycard rack, two keyholes, and a link rod;

wherein the key/keycard rack used in hanging/hooking the key/keycard, the keyhole used in the tumbler tightly locks in the keyhole;

wherein the link rod is mechanically connected to the box lid and the frame holder belongs to the mechanical locking unit;

wherein the below of the frame holder, the opposite of the drive shaft of the box lid, has two defect angles to limit an opening angle a between the box lid and the frame holder; where a is a real number greater than 0 (zero);

wherein the internal key/keycard box also includes adding a magnetic sensor, and a third permanent magnet belongs to the mechanical locking unit;

wherein the magnetic sensor is used in detecting the magnetic field of the second permanent magnet and used in executing the statement to automatically close the box lid of the key/keycard box from the micro-controller unit;

according to the eighth embodiment, wherein the control circuit is mechanically mounted on the back of the frame holder;

wherein the control circuit includes a printed circuit board;

according to the ninth embodiment, wherein the box lid and the frame box are made of metal conductive material;

according to the tenth embodiment, wherein the box lid and the frame box are also made of a non-metal conductive material such as synthetic resins;

wherein the box lid also includes adding an instruction manual board at the outside of the panel;

wherein the instruction manual board is made of metal conductive material;

wherein the internal box lid also includes two pieces of flat metal and a sliding tray;

wherein the two pieces of flat metal mechanically connect along the body of the box lid to prevent hacking from the security unit;

according to the eleventh embodiment, wherein the key/keycard box also includes the electric motor of the mechanical locking unit;

wherein the electric motor is mechanically connected to the frame holder, the link rod, and electrically linked to the control circuit;

wherein the electric motor operates according to the statement from the micro-controller unit to open/close the box lid of the key/keycard box through the link rod and the drive shaft;

wherein the engine configuration includes an electric motor, speed reduction box, lead screw rod, clutch unit, and transmission gear; all of them are mechanically connected;

the clutch unit includes driving gear and driven gear;

wherein the driven gear fixed mount to the link rod and the driving gear fixed mount to the center of transmission gear;

wherein the electric motor will drive the speed reduction box to rotate the lead screw rod to drive the transmission gear;

wherein the transmission gear will push/separate (clutch) the driving gear and the driven gear to perform the box lid opening/closing operation through the link rod and the drive shaft.

according to the twelfth embodiment, wherein the issuing and storing key/keycard cabinet is also used in storing the other personal belongings;

The other purpose of the invention is to provide a method of issuing and storing key/keycard, which includes steps:

i) providing the issuing and storing key/keycard;

ii) perform registration/verifying user rights/owner of key/keycard: specifically, the customer/user, through the terminal, can send information to the cloud server requesting permission to user rights/owner key/keycard by logging in to a website or through software applications such as user interface (UI) installed on the customer/user's terminal;

wherein the terminal of the customer/the user includes a personal digital assistant (PDA), mobile phone, iPad, or personal computer;

wherein the customer/user's information needs to provide to verify user rights/owner of key/keycard, including the phone number and/or email address associated with the password and/or other online biometrics information, including face shots from multiple angles;

iii) check whether the registration/verifying step is successful or not: if the registration/verifying user rights/owner of key/keycard is successful, proceed to step iv); otherwise, the key/keycard issuance process ends;

iv) the cloud server synchronizes data with the cabinet control server;

wherein the synchronized data includes the identification of user rights/owner of key/keycard data and departure data center;

v) the customer/user receives the user rights/owner of key/keycard authentication information via terminal;

wherein the user rights/owner of key/keycard authentication information includes methods used to authenticate user rights/owner of key/keycard, advice instructions via short message service (SMS) and/or email, and/or user interface (UI) via a network;

wherein the authentication information of the user rights/owner of key/key card is also encrypted in the form of a QR code (Quick Response code);

the customer/user takes/stores key/keycards at the issuing and storing key/keycard cabinet by authentication methods;

wherein authentication methods are performed by the customer/user at the screen, the mechanical keyboard, and/or biometric identification module;

wherein the authentication information of the user rights/owner of key/keycard is provided from one of the authentication methods, and then, through the local connection channel, the identifying owner of the key/keycard module at the cabinet control server checks and authenticates the user rights/owner of key/keycard based on the key/keycard owner's identification data;

wherein the checking and verifying user rights/owner of key/keycard in the identifying owner of key/keycard module also includes the connection to the data center of the cloud server;

vii) check whether the verifying user rights/owner of key/keycard in step vi) is successful: if successful, proceed to step viii) otherwise, go back to step iv) or end the method issuing and storing key/keycard;

viii) consider that the requested statement after the authentication step vi) is the statement to receive/keep the key/keycard: if it is the command requesting the storage of the key/keycard, perform step ix); otherwise, do step x);

ix) perform a query on which the key/keycard drawer is in a state where the key/keycard is not stored;

where, step ix) will be queried/recorded by the key/keycard drawer status from the key/keycard drawer status data;

x) opening the box lid so that the customer/user can receive/store the key/keycard;

wherein the cabinet control server, mainly the identifying owner of the key/keycard module, requested the micro-controller unit, through the local network channel and the mechanical locking unit, to open the box lid;

wherein the mechanical locking unit includes the deadbolt and the engine configuration;

wherein step x) also includes the auxiliary equipment unit: the microcontroller unit, through the local connection channel, executes a statement to turn on the light supply and/or alarm bell/security alarm to the customer/user conveniently receive/store keys/keycards;

wherein, randomly, the key/keycard drawer is selected;

wherein step x) also includes the operation of the security unit: specifically, through the magnetic sensor that does not recognize the presence of the second permanent magnet because the box lid opened, the micro-controller unit measures a time threshold X to close the box lid automatically;

wherein the time threshold X is the time interval for which the box lid is opened, and X is a real number greater than 0 (zero) and is expressed in seconds (s);

xi) check whether the box lid opening time exceeds the previously established time threshold X: if the box lid opening time exceeds the time threshold X, perform step xii); otherwise, perform step xiii);

xii) perform automatic closing of the box lid;

wherein the micro-controller unit performs step xii) by requesting the mechanical locking unit to close the box lid; precisely, through the local connection channel, the microcontroller unit drives the engine configuration the link rod to push the box lid towards the deadbolt to put the tumbler firmly into the deadbolt;

xiii) the key/keycard drawer sends information recording the state of the key/keycard box to the cabinet control server: specifically, the micro-controller unit, through the local network channel, sends the information to the cabinet control server to the key/keycard box status module performs storage recording to status data of key/keycard box;

wherein the status of key/keycard box includes the status of whether/without storing keys/keycards and/or the status of unauthorized access to the issuing and storing key/keycard cabinet;

xiv) the cabinet control server executes the data synchronization statement with the cloud server;

wherein the data synchronization module performs the data synchronization statement with the cloud server;

wherein the data storage of the cabinet control server that synchronized, including the key/keycard owner's identification data, the departure data, and the cloud server data, including the key/keycard owner's identification data center, the departure data center;

The other purpose of the invention is to provide an issuing and storing key/keycard system that could be easy expansion/added to key/keycard boxes, optimizing installation and operating costs;

The other purpose of the invention is to provide a method that not only issues and stores key/keycard but can also store many other personal belongings;

These and other advantages of the present invention will no doubt become obvious to those of ordinary skill in the art after having read the following detailed description of the preferred embodiments, which are illustrated in the various drawing Figures.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3A is a three-dimensional perspective view (3D) illustrating the detailed structure of the key/keycard drawer of the issuing and storing key/keycard cabinet according to the embodiments of the invention;

FIG. 3B is a three-dimensional perspective view (3D) illustrating the structure of the internal box lid of the key/keycard box according to the embodiments of the invention;

FIG. 3C is a two-dimensional picture illustrating the internal frame holder of the key/keycard box according to the embodiments of the invention;

FIG. 3D is a two-dimensional picture illustrating the control circuit of the key/keycard drawer according to the embodiments of the invention;

FIG. 3E is a three-dimensional picture illustrating the engine configuration of the key/keycard drawer according to the embodiments of the invention;

The invention is illustrated in the figures of the accompanying drawings which are meant to be exemplary and not limiting, in which like references are intended to refer to like or corresponding parts.

Figure 1:
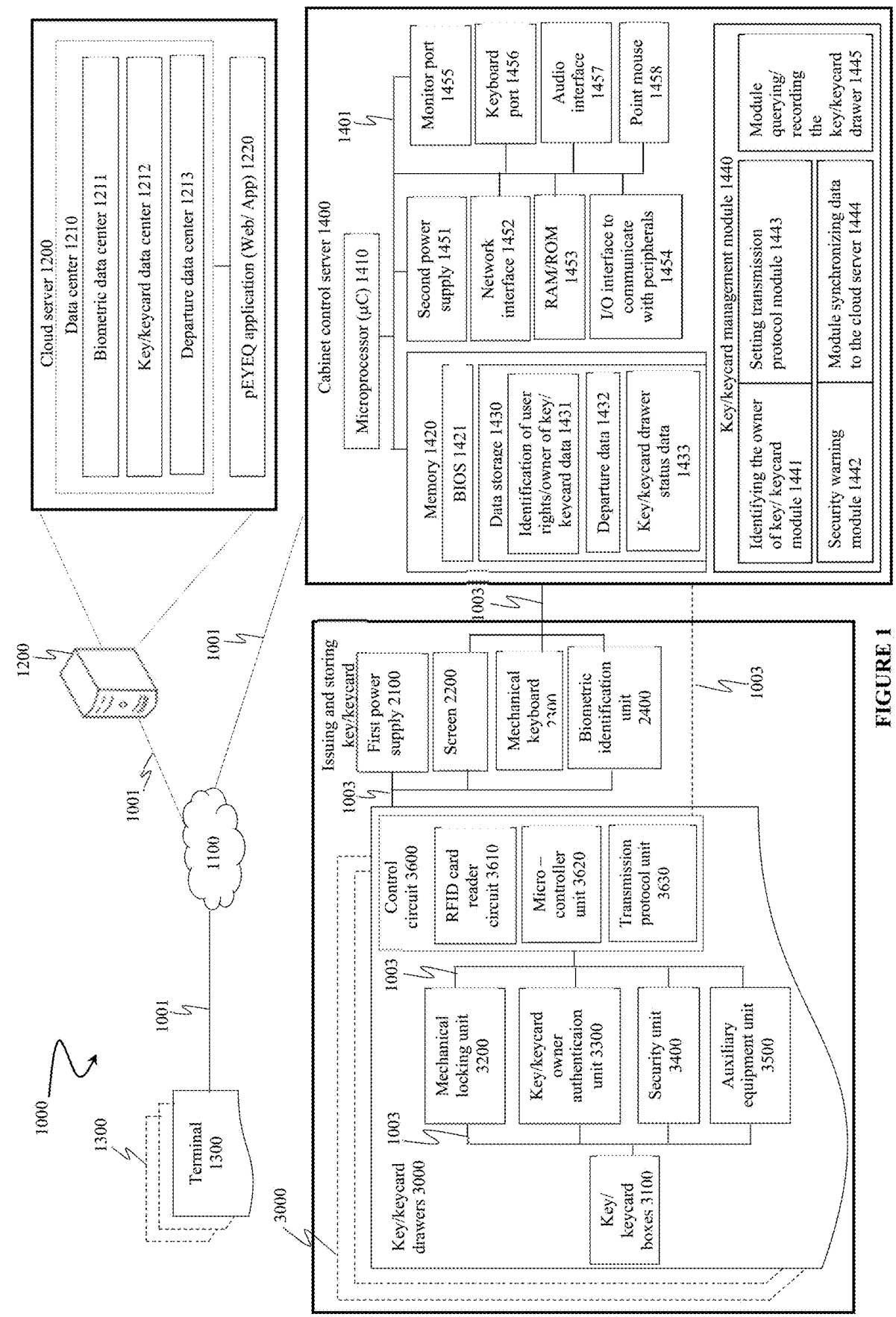
FIG. 1 is a block diagram illustrating an issuing and storing key/keycard system according to the invention's embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Many aspects of the present invention are now described concerning FIG. 1 is a block diagram illustrating an issuing and storing key/keycard system according to the embodiments of the invention. Wherein an issuing and storing key/keycard system 1000 ("EYEQ system 1000") includes: a network 1100, a cloud server 1200, at least a terminal 1300, a cabinet control server 1400 and at least an issuing and storing key/keycard cabinet 2000; wherein the cloud server 1200, the terminal 1300, the cabinet control server 1400 is connected to the network 1100 together through the internet communication channel 1001; wherein the issuing and storing key/keycard cabinet 2000 and the cabinet control server 1400 are connected by a local network channel 1002. According to the embodiments of the invention, the customer/the user, through the terminal 1300, can sign up/receive authentication methods to verify user rights/owner of key/keycard to the cloud server 1200; wherein the cloud server 1200 used in storing information of the customer/user and synchronizing partial/total information to the cabinet control server 1400 to the customer/user receive/store key/keycard correctly at the issuing and storing key/keycard cabinet 2000. According to the embodiments of the invention, the issuing and storing key/keycard cabinet 2000 is used in the issuance and storage of key/keycard of the customer/user who has user rights/owner of key/keycard.

According to some aspects of the invention, the local network channel 1002 may be different physical connections, including wired communications or wireless communications such as Ethernet, RS-232, RS-485, USB, or any communication. According to the preferred embodiment of the invention, the local network channel 1002 is a wireless communication channel that may include. However, it is not limited to a shortrange wireless communication channel, a medium-range wireless communication channel, and a long-range wireless transmission channel. The short-range wireless communication channels include ZigBee™/IEEE 802.15.4, Bluetooth™, Z-wave, NFC, Wi-fi/802.11, IEEE 802.15.4, IEEE 802.22, ISA100a, USB không dây, LoRa, LiFi, etc. The mediumrange wireless communication channels include Wi-fi and hotspots. The long-range wireless transmission channels include UHF/VHF Radio Frequencies.

The EYEQ system 1000 of the invention is a web-based platform where all units and the customer/user's terminals 1300 are connected to the network 1100, such as a wide area network (WAN) on a cloud server via the internet communication channel 1001. According to some aspects of the invention, the customer/user can send information to the cloud server 1200 requesting permission to user rights/owner key/keycard by logging in to a website or through software applications such as user interface (UI) installed on the customer/user's terminal 1300. According to other aspects of the invention, the customer/user can get key pairs used to authenticate user rights/owner of key/keycard, advice instructions via short message service (SMS), and/or email and/or user interface (UI) via the network 1100. According to the embodiment of the invention, the terminal 1300 of the customer/user includes but is not limited to a personal digital assistant (PDA), mobile phone, iPad, or personal computer.

Following FIG. 1, the cloud server 1200 also includes a data center 1210 used in storing the information of the customer/user of the whole EYEQ system 1000 and a Web/App management application ("pEYEQ application 1220") so the customer/user can sign-up/login to verify user rights/owner of key/keycard. According to other aspects of the invention, the data center 1210 includes a biometric data center 1211, identification user rights/owner of key/keycard data center 1212, and departure data center 1213 of the customer/user. According to the embodiments of the invention, the pEYEQ application 1220 also includes the synchronized data statement to the cabinet control server 1400, and the synchronized data includes identification user rights/owner of key/keycard data center 1212 and departure data center 1213; moreover, the pEYEQ application 1220 also includes the verifying user rights/owner of key/keycard statement is sent to the cabinet control server 1400 reply on biometric data center 1211 if the verifying user rights/owner of key/keycard statement is the requested statement by biometric such as the face, retina/iris, fingerprint, etc.

According to some aspects of the invention, the cloud server 1200 is a commonly used in the field of information technology, so its detailed structure will not be described in detail here; this invention, especially the invention in the form of disclosure, does not obscure other important aspects of the invention.

As shown in FIG. 1, the issuing and storing key/keycard cabinet 2000 includes the first power supply 2100, the screen 2200, the mechanical keyboard 2300, the biometric identification unit 2400, a lot of the key/keycard drawers 3000; wherein the first power supply 2100 used in electrically connecting to the key/keycard drawer 3000, the screen 2200, the mechanical keyboard 2300 and the biometric identification unit 2400. The key/keycard drawer 3000 is a sealed box used in storing key/keycard, and the key/keycard drawer 3000 is closed/opened by the statement from the cabinet control server 1400 through the local network channel 1002. The screen 2200, the mechanical keyboard 2300, and the biometric identification unit 2400 is used in receiving the verification information user rights/owner of the key/keycard from the customer/user; the identifying information is transmitted to the cabinet control server 1400 through the local connection channel 1003; the cabinet control server 1400 will identify information of the user rights/owner of key/keycard to send statements to open the key/keycard drawer 3000 through the local network channel 1002; According to the embodiments of the invention, the local connection channel 1003 includes electrical connection and/or magnetic connection and/or mechanical connection.

As shown in FIG. 1, the key/keycard drawer 3000 includes the key/keycard box 3100, the mechanical locking unit 3200, the key/keycard owner authentication unit 3300, the security unit 3400, the auxiliary equipment unit 3500, and the control circuit 3600; all of them are connected by the local connection channel 1003. The control circuit 3600 includes a micro-controller unit 3620, an RFID card reader circuit 3610, and a transmission protocol port 3630; wherein the micro-controller unit 3620 sends a statement controlling the mechanical locking unit 3200, the key/keycard owner authentication unit 3300, the security unit 3400, and the auxiliary equipment unit 3500 through the local connection channel 1003; moreover, the micro-controller unit 3620 also records response from the security unit 3400 and the auxiliary equipment unit 3500 for to send the warning message/notification message to the control server 1400;

According to the embodiments of the invention, the mechanical locking unit includes mechanical key devices used in opening/closing the key/keycard box 3100, such as stainless-steel deadbolts, an electric motor, an electromagnetic lock, etc. The key/keycard owner authentication unit 3300 is a device/electromagnetic card used in storing identifying information on user rights/owner of key/keycard and using electromagnetic technology to retrieve information; according to the preferred embodiments of the invention, the key/keycard owner authentication unit 3300 is the RFID tag card. The security unit 3400 includes devices that record and notify the opening/closing status of the key/keycard box 3100 or illegal activities such as a camera, sensors, and/or IoT devices. The auxiliary equipment unit 3500 also includes devices handling states related to the surroundings, such as lights, pressure sensors, etc.

As shown in FIG. 1, according to some aspects of the invention, through the local network channel 1002 and the transmission protocol port 3630, the micro-controller unit 3620 receives the identification of user rights/owner of key/keycard data 2131 from the cabinet control server 1400, replies on the RFID card reader circuit 3610, the micro-controller unit 3620 reading information from the key/keycard owner authentication unit 3300; in case the identification user rights/owner of key/keycard data 1431 in the cabinet control server 1400 matches with information stored in the key/keycard owner authentication unit 3300, the micro-controller unit 3620 will request the mechanical locking unit 3200 to open/close the key/keycard box 3100.

As shown in FIG. 1, the security unit 3400 sends the opening/closing status of the key/keycard box 3100 to the micro-controller unit 3620; in case the box lid 3110 is not closed within the previously established time threshold X, the micro-controller unit 3620 will automatically request the mechanical locking unit to close the key/keycard box 3100. According to the embodiments of the invention, X is a real number greater than 0 (zero). Moreover, the security unit 3400 also sends a warning statement when unauthorized access to the key/keycard box 3100. Then, the micro-controller unit 3620, through the transmission protocol port 3630 and the local network channel 1002, will send the warning statement to the security warning module 1442 of the cabinet control server 1400 to send the soundly warning message to the audio interface 2157.

Figure 2A:
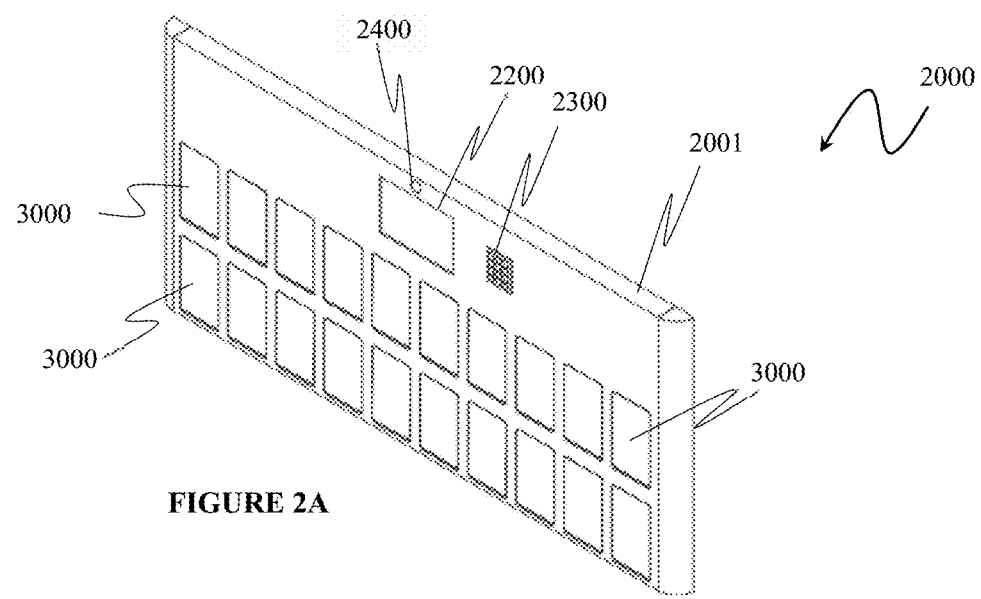
FIG. 2A is a three-dimensional perspective view (3D) illustrating the structure of an issuing and storing key/keycard cabinet according to the embodiments of the invention.

According to the embodiments of the invention, the auxiliary equipment unit 3500 sends information about the surroundings state to the micro-controller unit 3620. In case the key/keycard box 3100 is open, and the environment is low/dark, the micro-controller unit 3620 will send the turning on a light statement to the auxiliary equipment unit 3500. Details about the key/keycard, the box lid, the light, and the structure of the key/keycard box 3100 of the key/keycard drawer 3000 are discussed in the following, as shown in FIG. 2A.

As shown in FIG. 1, the cabinet control server 1400 includes a microprocessor 1410 communicating with a memory 1420 through bus 1401. The cabinet control server also has a second power supply 1451, a network interface 1452, a read-only memory (ROM)/random-access memory (RAM) 1453, an input/output interface for peripherals (I/O interface) 1454, a monitor port 1455, a keyboard port 1456, an audio interface 1457 and a point mouse 1458. The second power supply 1451 provides an electric source to the cabinet control server 1400. The memory 1420 includes a basic input/output system (BIOS) 1421, a data storage 1430 to store the identification user rights/owner of key/keycard data 1431, and the departure data 1432. Specifically, the memory 1420 stores the basic input/output system (BIOS) 1421 to control the low-level operation of the cabinet control server 1400. The memory 1420 also stores an operating system (OS) 1421 to control the operation of the cabinet control server 1400. The data storage 1430 illustrates examples of computer-readable storage media as well as computer-readable statements, structure data, programming modules, or other data storage to store the identification user rights/owner of key/keycard data 1431 and the departure data 1432. Operating system (OS) 1421 may include an open-source operating system such as UNIX or LINUX™, or a specialized operating system such as Microsoft Corporation's Windows® OS or Apple Inc.'s IOS®. OS 1421 can also be a Java virtual machine module that allows control of hardware components and operating system operations through Java application programs.

According to the embodiments of the invention, the cabinet control server also includes adding a key/keycard management module 1440, including an identifying owner of key/keycard module 1441, a security warning module 1442, a setting transmission protocol module 1443, and the module synchronizing data to the cloud server 1200. According to some aspects of the invention, the identifying owner of key/keycard module 1441 receives information of the customer/user from the screen 2200 or the mechanical keyboard 2300 or the biometric identification unit 2400 at the I/O interface to communicate with peripherals 1454 such as the camera, the camera 3D; wherein the received information includes biometric information such as face or fingerprint; the received information also includes email/phone number and password or reservation code or QR code or combining two or more of these authentication factors for to create twofactor authentication or three-factor authentication; next, the information will be matched with the identification user rights/owner of key/keycard data 1431 and will be forwarded to the control circuit 3600 of the key/keycard drawer via the local network channel 1002; in case the identifying information owner of the key/keycard is incorrect or there is unauthorized access to EYEQ system 1000, the security warning module 1442 will send a warning sound statement to the audio interface 1457. According to the embodiments of the invention, the key/keycard owner's identification data also includes the command to synchronize data from the data synchronization module with the cloud server 1200; the synchronized data includes the identification of user rights/owner of key/keycard data 1431, and departure data 1432 between the cabinet control server with identification of user rights/owner of key/keycard data center 1212 and departure data center 1213 of the cloud server 1200.

In the following description, the key/keycard owner authentication unit 3300 includes the key, the key/keycard, the RFID tag card used to open mechanical or magnetic doors, and/or other personal belongings of the customer/user unless the context indicates.

Referring to FIG. 2A is a three-dimensional perspective view (3D) illustrating the structure of an issuing and storing key/keycard cabinet according to the embodiments of the invention. According to that, the issuing and storing key/keycard cabinet 2000 includes adding a frame rack 2001 used to mechanically connect to the first power supply 2100, the screen 2200, the mechanical keyboard 2300, and a lot of the key/keycard drawers 3000. According to the preferred embodiments of the invention, the frame rack 2001 is mechanically mounted on the wall of the building/hotel, and the screen 2200 is a touch screen. According to some aspects of the invention, the I/O interface to communicate with peripherals 1454 of the cabinet control server 1400 will connect to the camera and/or camera 3D and/or biometric identification devices such as the face retina/iris, fingerprint, etc.

Figure 2B:
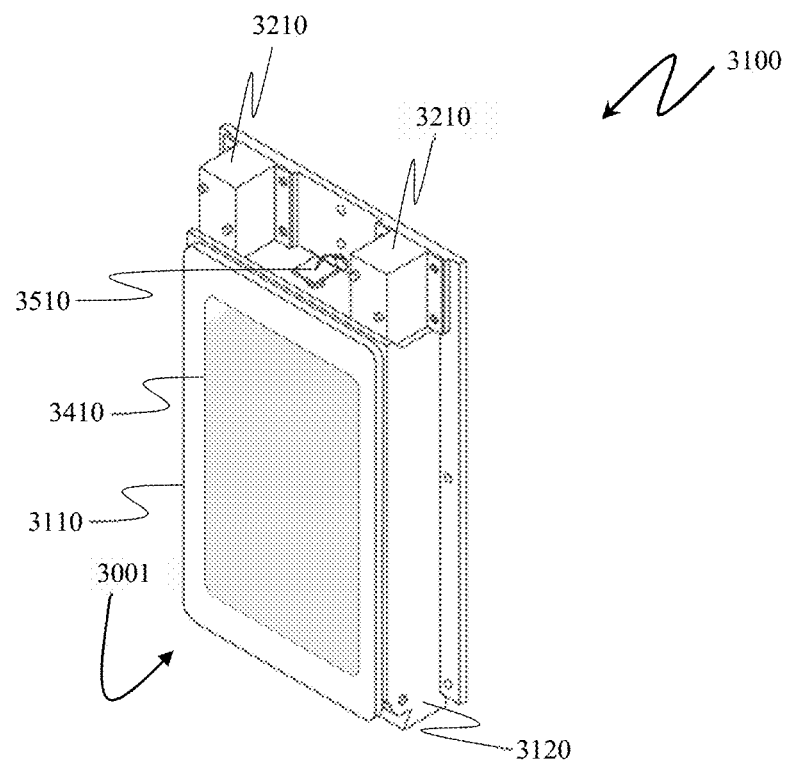
FIG. 2B is a three-dimensional perspective view (3D) illustrating the overview structure of the key/keycard box of the issuing and storing key/keycard cabinet in the closed state according to the embodiments of the invention.

Referring to FIG. 2B is a three-dimensional perspective view (3D) illustrating the overview structure of the key/keycard box of the issuing and storing key/keycard cabinet in the closed state according to the embodiments of the invention. The key/keycard box 3100 has a shape rectangular/square, including a box lid 3110, a frame box 3120, a light supply 3510, and two deadbolts 3210; wherein the box lid 3110, the light supply 3510, and two deadbolts 3210 are mechanically connected to the frame box 3120; wherein the light supply 3510 and the deadbolt 3210 are electrically connected to the control circuit 3600. According to the embodiments of the invention, the light supply 3510 belongs to the auxiliary equipment unit 3500, and the deadbolt 3210 belongs to the mechanical locking unit 3200, as shown in FIG. 1. The box lid 3110 and the frame box 3120 are made of metal conductive material to prevent the possibility of being read (hacked) information from the security unit 3400, especially the security unit 3400 is the RFID tag card and/or the mechanical key with an RFID tag card. According to the other embodiments of the invention, the box lid 3110 and the frame box 3120 are also made of a non-metal conductive material such as synthetic resins to reduce the weight of the issuing and storing key/keycard 2000; the box lid 3110 also includes adding an instruction manual board 3410 at the outside of the panel 3001, the instruction manual board 3410 is made of metal conductive material to prevent the possibility of being read (hacked) information from the security unit 3400.

Referring to FIG. 3A is a three-dimensional perspective view (3D) illustrating the detailed structure of the key/keycard drawer of the issuing and storing key/keycard cabinet according to the embodiments of the invention. According to that, the internal 3002 box lid 3110, the opposite of deadbolt 3210, also includes adding two tumblers 3111 have shape hook up, at the first position on the two tumblers 3111 are attached a first permanent magnet 3111a and a second permanent magnet 3430. The internal 3002 box lid 3110, at the bottom position, also includes adding a drive shaft 3112 used in mechanically linking with the frame box 3120 at a link rod 3123 of the frame box 3120. According to the embodiments of the invention, the deadbolt 3210 is a hollow bar used to protect the tumbler 3111a from being broken/infiltrated by outside agents; in addition, the deadbolt 3210 is also used to hold/release the tumbler 3111, used for opening/closing the box lid 3110; according to other aspects of the invention, the micro-controller unit 3620 of the control circuit 3600 will request the deadbolt 3210 to release the tumbler 3111 to open the box lid 3110. Details of the first permanent magnet 3111a, the second permanent magnet 3430, and the drive shaft 3112 of the box lid 3110 are discussed in the following FIG. 3B.

Referring to FIG. 3B is a three-dimensional perspective view (3D) illustrating the structure of the inside of the box lid of the key/keycard box according to the embodiments of the invention. According to that, wherein the internal box lid 3002 also includes two pieces of flat metal 3440 and a sliding box 3113; wherein the two pieces of flat metal 3440 mechanically connect along the body of the box lid 3110 to prevent hacking from the security unit 3400. According to the embodiments of the invention, the sliding box 3113 is used in storing the key/keycard owner authentication unit 3300 in the form of an RFID tag card, which prevents the RFID tag card from slipping out of the key/keycard box 3100; wherein the sliding box 3113 has a U shape, hollow inside to facilitate the operation of taking/storing the RFID tag card to the sliding box 3113. According to the embodiments of the invention, the second permanent magnet 3430 and two pieces of flat metal 3440 belongs to the security unit 3400.

As shown in FIG. 3A, the frame box 3120 is an empty box front view 3003 and is also used to store keys/keycards and/or other items belonging to the customer/user. The frame box 3120 also includes adding a key/keycard rack 3121, two keyholes 3122, and a link rod 3123; wherein the key/keycard rack 3121 is used in hanging/hooking the key/keycard, the keyhole 3122 is used to create a link between the tumbler 3111 and deadbolt 3210 to enable the opening/closing of the box lid 3110 to be carried out smoothly. The link rod 3123 is mechanically connected to the box lid 3110 and the frame box 3120 belongs to the mechanical locking unit 3200. According to other embodiment of the invention, the mechanical locking unit 3200 of the key/keycard box 3100 also includes the electric motor 3220 that is mechanically connected to the frame holder 3120, the link rod 3123, and electrically linked to the control circuit 3600; wherein the engine configuration 3220 operates according to the statement from the micro-controller unit 3620 to open/close the box lid 3110 of the key/keycard box 3100 through the link rod 3123 and the drive shaft 3112. The below of the frame box 3120, the opposite of the drive shaft 3112 of the box lid 3110, has two defect angles 3124 to limit an opening angle a between the box lid 3110 and the frame box 3120; where a is a real number greater than 0 (zero). According to the embodiments of the invention, the opening angle a of the box lid 3110 compared to the frame holder is from 80°-100°.

Referring to FIG. 3C is a two-dimensional picture illustrating the internal 3003 frame holder of the key/keycard box 3120 according to the embodiments of the invention. According to that, the internal key/keycard box 3100 includes adding a magnetic sensor 3420, and a third permanent magnet 3230 belongs to the mechanical locking unit 3200. According to the embodiments of the invention, the third permanent magnet 3230 has a face at the same poles as the first permanent magnet 3111a; in the state of the box lid 3110 close to the key/keycard box 3100, the first permanent magnet 3111a will be close up the third permanent magnet 3230, the embodiment that third permanent magnet 3230 has the face at the same poles as the first permanent magnet 3111a to make opening the box lid 3110 easier. The magnetic sensor 3420 detects the magnetic field of the second permanent magnet 3430. Specifically, the magnetic sensor 3420 will generate a signal when it detects the presence of the second permanent magnet 3430, and then the micro-controller unit 3620 will record information that the key/keycard box 3100 is in a closed state; otherwise, the magnetic sensor 3420 will not generate a signal when the second permanent magnet 3430 is not detected because the opening angle a loses the connection between the magnetic sensor 3420 and the second permanent magnet 3430. At this time, the micro-controller unit 3620 will recognize the key/keycard box 3100 is in an opened state, and the micro-controller unit 3620 will request the engine configuration 3220 to close the box lid 3110 if the opening time of key/keycard box 3100 exceeds the previously established time threshold X; where X is a real number greater than 0 (zero) and is in seconds(s). According to a preferred embodiment of the invention, the magnetic sensor 3420 is the Hall sensor. According to other aspects of the invention, the autoclosing operation of the box lid 3110 is always based on the time threshold X regardless of whether the customer/user has taken/stored the key/keycard or not to ensure the safety of the customer/user when using the EYEQ system 1000 in taking/storing the key/keycard.

As shown in FIG. 3C, according to the embodiments of the invention, the key/keycard owner authentication unit 3300 includes the mechanical key 3310 and/or the magnetic RFID tag card 3320. According to aspects of the invention, in case the key/keycard owner authentication unit 3300 is a mechanical key 3310; moreover, the top end of the mechanical key 3310 will be mechanically mounted on at least one RFID tag card.

Referring to FIG. 3D is a two-dimensional picture illustrating the control circuit of the key/keycard drawer 3000 according to the embodiments of the invention. The control circuit 3600 is mechanically mounted on the back of the frame box 3120; wherein the control circuit includes a micro-controller unit 3620, an RFID card reader circuit, and a transmission protocol port 3630. The functions of the RFID reader circuit, micro-controller unit 3620, and the transmission protocol port 3630 are described in detail in FIG. 1. According to the invention's preferred embodiments, the control circuit 3600 includes a printed circuit board (PCB).

Referring to FIG. 3E is a three-dimensional picture illustrating the engine configuration of the key/keycard drawer according to the embodiments of the invention. According to that, the engine configuration includes the electric motor 3221, the speed reduction box 3222, the lead screw rod 3223, the clutch unit 3224, and the transmission gear 3225; all of them are mechanically connected. According to the embodiments of the invention, the clutch unit 3224 includes the driving gear 3224b and the driven gear 3224a; wherein the driven gear 3224a is fixed mount to the link rod 3123 and the driving gear 3224b is fixed mount to the center of the transmission gear 3225. When receiving the statement to close/open the box lid 3110 from the micro-controller 3620, the electric motor 3221 will drive the speed reduction box 3222 to rotate the lead screw rod 3223 to drive the transmission gear 3225; At this time, depending on the statement from the micro-controller 3620 which is the statement to close or open the box lid, the transmission gear 3225 will push/separate (clutch) the driven gear 3224a and the driving gear 3224b to perform the box lid 3110 opening/closing operation through the link rod 3123 and the drive shaft 3112.

According to the embodiments of the invention, the deadbolt 3210, the electric motor 3221, the speed reduction box 3222, and the clutch unit 3224 are commonly used in many different fields so they will not be described in detail here so as not to obscure other aspects of the invention. According to a preferred embodiment of the invention, the electric motor includes a servo motor.

Figure 4:
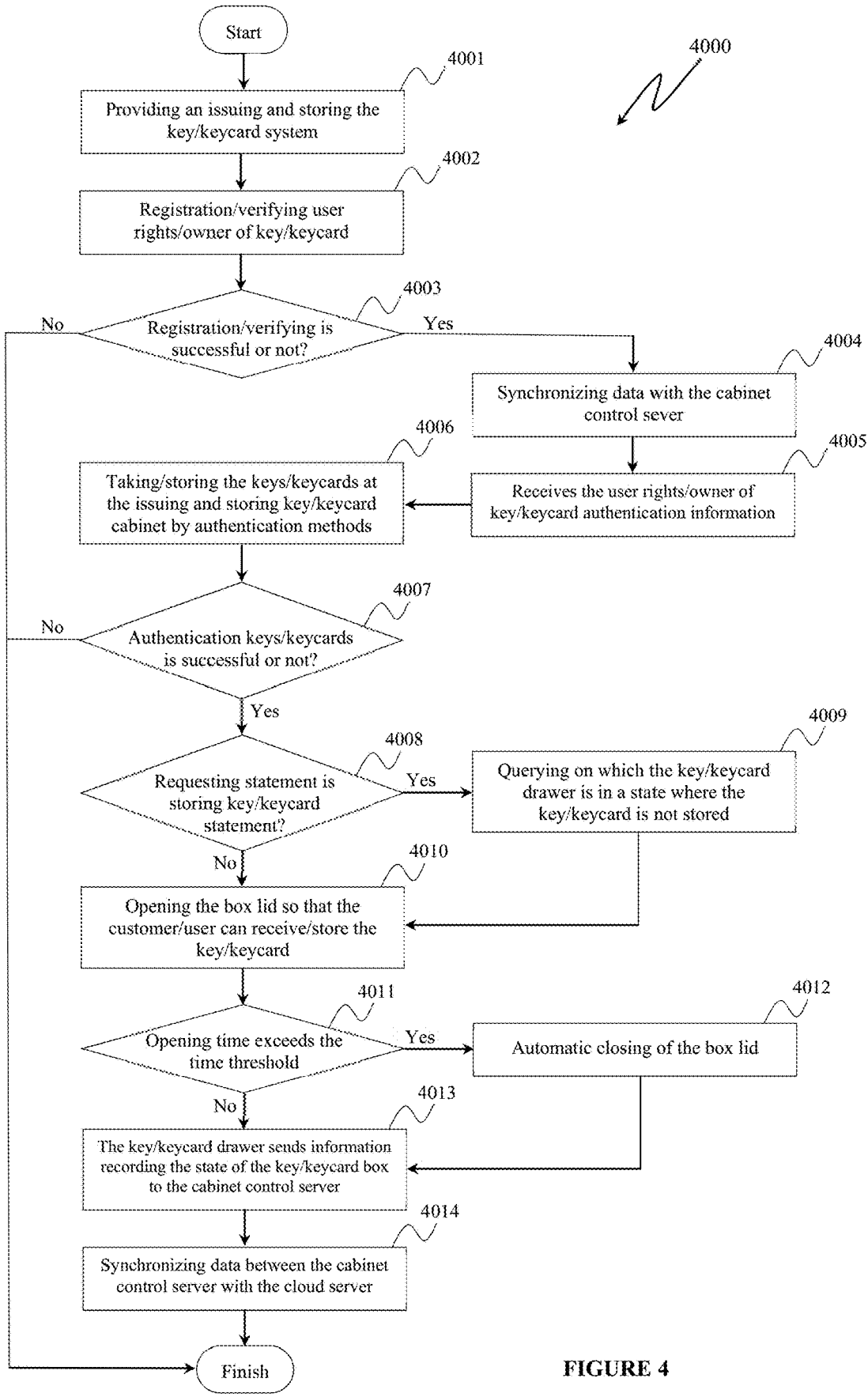
FIG. 4 is a flowchart illustrating the method of issuing and storing key/keycard according to the embodiments of the invention.

Referring to FIG. 4 is a flowchart illustrating the method of issuing and storing key/keycard according to the embodiments of the invention. According to that, the method of issuing and storing key/keycard ("method 4000") begins with step 4001, which is to provide the EYEQ system 1000 as detailed in FIG. 1-FIG. 3D.

In step 4002, perform registration/authentication of user rights/owner key/keycard: specifically, the customer/user, through the terminal 1300, can send information to the cloud server 1200 requesting permission to user rights/owner key/keycard by logging in to a website or through software applications such as user interface (UI) installed on the customer/user's terminal 1300. According to the embodiments of the invention, the customer/user's information needs to provide to authenticate the user rights/owner of the key/keycard, including the phone number and/or email address associated with the password and/or other online biometrics information, including face shots from multiple angles, etc.

According to the other embodiments of the invention, the registration information for authentication of user rights/owner key/keycard also includes the use of a third-party account to log into the EYEQ system 1000; wherein the third-party account for authentication of user rights/owner key/keycard includes, but is not limited to, Google mail, Facebook, Twitter, etc.

In step 4003, check whether the registration/verifying user rights/owner of key/keycard is successful or not: if the registration/verifying user rights/owner of key/keycard is successful, proceed to step 4000; otherwise, the method 4000 ends;

In step 4004, the cloud server 1200 synchronizes data with the cabinet control server 1400. According to the embodiment of the invention, the data synchronization statement shall be executed by the pEYEQ application (web/app) 1220; wherein the data center of the cloud server 1200 includes identification of user rights/owner of the key/keycard data center 1212, departure data center 1213 and data of the cabinet control server 1400 have identification user rights/owner of key/keycard data 1413, departure data 1432.

In step 4005, the customer/user receives the user rights/owner of key/keycard authentication information. According to some embodiments of the invention, the customer/user's terminal 1300 can receive methods used to authenticate user rights/owner of key/keycard, advice instructions via short message service (SMS) and/or email and/or user interface (UI) via the network. According to some embodiments of the invention, the authentication information of the user rights/owner of key/keycard is also encrypted in the form of a QR code (Quick Response code).

In step 4006, the customer/user takes/stores key/keycards at the issuing and storing key/keycard cabinet by authentication methods. According to some aspects of the invention, the authentication methods to verify user rights/owner of key/keycard include:

a) authentication using biometrics including face, fingerprint, etc. According to the preferred embodiment of the invention, using the the camera/camera 3D at the biometric identification unit 2400 to authenticate the customer/user's face;

b) authentication using QR code;

c) authentication using hotel/restaurant reservation code;

d) authentication using an email address/mobile number combine with a password;

e) authentication using a third-party account such as Google, Facebook, and Twitter;

According to other embodiment of the invention, step 4006 also includes verifying two-factor authentication or three-factor authentication by combining two or more of these authentication factors a)-e);

Continue with step 4006, the authentication methods are performed by the customer/user at the screen 2200, the mechanical keyboard 2300, and/or biometric identification unit 2400. The verification information user rights/owner of key/keycard, and then, through the local connection channel 1003, the identifying owner of key/keycard module 1441 at the cabinet control server 1400 checks and authenticates the user rights/owner of key/keycard based on the identification user rights/owner of key/keycard data 1431; wherein the checking and verifying user rights/owner of key/keycard in the identifying owner of key/keycard module also includes the connection to the data center of the cloud server; According to the embodiment of the invention, the checking and verifying user rights/owner of key/keycard in the identifying owner of key/keycard module 1441 also includes the connection to the data center 1210 of the cloud server 1200;

In step 4007, check whether the verifying user rights/owner of key/keycard in step 4006 is successful: if successful, proceed to step 4008; otherwise, go back to step 4006 or end the method issuing and storing key/keycard 4000;

In step 4008, consider that the requested statement after the authentication step 4006 is the statement to receive/keep the key/keycard: if it is the command requesting the storage of the key/keycard, perform step 4009; otherwise, do step 4010;

In step 4009, perform a query on which the key/keycard box 3100 is in a state where the key/keycard is not stored. According to the embodiment of the invention, step 4009 will be queried/recorded by module querying/recording the key/keycard drawer 1445 from the key/keycard drawer status data 1433.

In step 4010, open the box lid 3110, so the customer/user can receive/store the key/keycard. According to some aspects of the invention, the cabinet control server 1400, mainly the identifying owner of key/keycard module 1441, requested the micro-controller unit 3620 through the local network channel 1002 and the mechanical locking unit 3200 to open the box lid 3110; wherein the mechanical locking unit includes the deadbolt 3210 and the engine configuration 3220; At step 4010 also includes the auxiliary equipment unit 3500: the micro-controller unit 3620, through the local connection channel 1003, executes a statement to turn on the light supply and/or alarm bell/security alarm 3510 to the customer/user conveniently receive/store keys/keycards, especially, the key/keycard drawer 3000 is selected randomly.

According to the embodiment of the invention, step 4010 also includes the operation of the security unit 3400; specifically, through the magnetic sensor 3420 that does not recognize the presence of the second permanent magnet 3430 because the box lid opened, the micro-controller unit 3620 will measure a time threshold X to close the box lid 3110 automatically;

In step 4011, check whether the box lid 3110 opening time exceeds the previously established time threshold X: if the box lid 3110 opening time exceeds the time threshold X, perform step 4012; otherwise, perform step 4013;

In step 4012, perform automatic closing of the box lid 3110 if the box lid 3110 opening time exceeds the previously established time threshold X. According to the embodiment of the invention, the micro-controller unit 3620 requests the mechanical locking unit 3200 to close the box lid 3110; precisely, through the local connection channel 1003, the micro-controller unit 3620 controls the engine configuration 3220 to drive the link rod 3123 to push the box lid 3110 towards the deadbolt 3210 to put the tumbler 3111 firmly into the deadbolt 3210;

In step 4013, the key/keycard drawer 3000 sends information recording the state of the key/keycard box 3100 to the cabinet control server 1400: specifically, the micro-controller unit 3620, through the local network channel, sends the information to the cabinet control server 1400 to module querying/recording the key/keycard drawer 1445 performs storage recording to key/keycard drawer status data 1433. According to the embodiment of the invention, the status of key/keycard box 3100 includes the status of whether/without storing keys/keycards and/or the status of unauthorized access to the issuing and storing key/keycard cabinet 2000;

In step 4014, the cabinet control server 1400 executes the data synchronization statement with the cloud server 1400. According to the embodiment of the invention, the data synchronization module performs the data synchronization statement with the cloud server 1200; wherein the data storage of the cabinet control server 1400 that synchronized, including the identification user rights/owner of key/keycard data 1431, the departure data 1432, and the cloud server data 1200, including the key/keycard owner's identification data center 1212, the departure data center 1213;

These computer program instructions may also be stored in a computer readable medium that can direct a computer, other programmable data processing apparatus, or other devices to function in a particular manner, such that the instructions stored in the computer-readable medium produce an article of manufacture, including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods, and computer program products according to various embodiments of the present invention. In this regard, each block in the flowchart or block diagrams may represent a module, segment, or portion of code, comprising one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting to the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

While a specific embodiment has been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

DESCRIPTION OF NUMERALS

1000 The issuing and storing key/keycard system
1100 Network
1001 Internet communication channel
1002 Local network channel
1003 Local connection channel
1200 Cloud server
1210 Data center
1211 Biometric data center
1212 Key/keycard data center
1213 Departure data center
1220 pEYEQ application (web/app)
1300 Terminal
1401 Bus
1410 Microprocessor
1420 Memory
1421 Basic input/output system (BIOS)
1430 Data storage
1431 Identification user rights/owner of key/keycard data
1432 Departure data
1433 Key/keycard drawer status data
1440 Key/keycard management module
1441 Identifying owner of key/keycard module
1442 Security warning module
1443 Setting transmission protocol module
1444 Module synchronizing data to the cloud server
1445 Module querying/recording the key/keycard drawer
1451 Second power supply
1452 Network interface
1453 Read-only memory (ROM)/random-access memory (RAM)
1454 I/O interface to communicate with peripherals
1455 Monitor port
1456 Keyboard port
1457 Audio interface
1458 Point mouse
2000 The issuing and storing key/keycard cabinet
2001 Frame rack
2100 First power supply
2200 Screen
2300 Mechanical keyboard
2400 The Biometric Identification Unit
3000 The key/keycard drawers
3001 The panel
3002 Internal box lid
3003 A two dimensional picture illustrating the internal
3100 The Key/keycard box
3110 Box lid
3111 Tumbler
3111a First permanent magnet
3112 Drive shaft
3113 Sliding box
3120 The Frame box
3121 Key/keycard rack
3122 Keyhole 3123 Link rod
3124 Defect angle
3200 Mechanical locking unit
3210 Deadbolt
3220 Engine configuration
3221 Electric motor
3222 Speed reduction box
3223 Lead screw rod
3224 Clutch unit
3224a Driven gear
3224b Driving gear
3225 Transmission gear
3300 Key/keycard authentication unit
3310 Mechanical key
3320 RFID tag card
3400 Security unit
3410 Instruction manual board
3420 Magnetic sensor
3430 Second permanent magnet
3440 Piece of flat metal
3500 Auxiliary equipment unit
3510 The light supply and/or alarm bell/security alarm
3600 Control circuit
3610 RFID card reader circuit
3620 Micro-controller unit
3630 Transmission protocol port

What is claimed is:

1. An issuing and storing key/keycard system includes a network, a cloud server, at least a terminal, a cabinet control server, and at least an issuing and storing key/keycard cabinet;

wherein the cloud server, the terminal, and the cabinet control server are connected to the network together through the internet communication channel;

wherein the issuing and storing key/keycard cabinet and the cabinet control server are connected by a local network channel;

wherein the customer/the user, through the terminal, can sign up/receive authentication methods to verify user rights/owner of key/keycard to the cloud server;

wherein authentication methods include: biometrics, QR code, hotel/restaurant reservation code, email address/mobile number combined with a password, third party account, and a combination thereof;

wherein the issuing and storing key/keycard cabinet used in the issuance and storage of key/keycard of the customer/user who has user rights/owner of key/keycard;

wherein the cloud server used in storing information of the customer/user and synchronizing partial/total information to the cabinet control server to the customer/user receive/store key/keycard correctly at the issuing and storing key/keycard cabinet by one or multiple methods of authentication;

wherein the cabinet control server is used in controlling and using the issuing and storing key/keycard cabinet through the local area network, at the same time, synchronizing partial/total information to the cloud server through the internet communication channel;

wherein the cloud server also includes a Web/App management application so the customer/user can sign-up/login to verify user rights/owner of key/keycard;

wherein the issuing and storing key/keycard cabinet includes a key/keycard drawers is a sealed box used in storing key/keycard, and closed/opened by a statement from the cabinet control server through the local network channel;

wherein the key/keycard drawers including a key/keycard box, and a key/keycard owner authentication unit; all of them are connected by the local connection channel;

(a) the key/keycard owner authentication unit is devices/electromagnetic cards used in storing identifying information user rights/owner of key/keycard and using electromagnetic technology to retrieve information; wherein the key/keycard owner authentication unit includes the mechanical key with an RFID tag card, the mechanical key and the RFID tag card, the magnetic RFID tag card;

(b) the key/keycard box is a shape rectangular/square including a box lid, a frame holder, a light supply, and two deadbolts are mechanically connected to the frame holder;

the light supply and the deadbolt are electrically connected to the control circuit:

the light supply belongs to the auxiliary equipment unit and the deadbolt belongs to the mechanical locking unit;

the internal box lid, the opposite of the deadbolt, also includes adding two tumblers have shape hook up; at the first position on the two tumblers are attached a first permanent magnet and a second permanent magnet;

the deadbolt is used to protect the tumbler from being hacked/infiltrated by an external agent; in addition, the deadbolt is also used to hold/release the tumbler, used for opening/closing the box lid;

the internal box lid, at the bottom position, also includes adding a drive shaft used in mechanically linking with the frame holder at a link rod of the frame holder:

the internal box lid also includes the sliding tray used in storing the key/keycard owner authentication unit in the form of the RFID tag card, which prevents the RFID tag card from slipping out of the key/keycard box; the difference is the sliding tray has a U shape, hollow inside to facilitate the operation of taking/storing the RFID tag card to the sliding tray;

the frame holder also includes adding a key/keycard rack, two keyholes, and a link rod:

the key/keycard rack is used in hanging/hooking the key/keycard, the keyhole is used to create a link between the tumbler and the deadbolt;

the link rod is mechanically connected to the box lid and the frame holder belongs to the mechanical locking unit;

the below of the frame holder, the opposite of the drive shaft of the box lid, has two defect angles to limit an opening angle a between the box lid and the frame holder; where a is a real number greater than 0 (zero);

the internal key/keycard box also includes adding a magnetic sensor, and a third permanent magnet belongs to the mechanical locking unit;

the magnetic sensor is used in detecting the magnetic field of the second permanent magnet and used in executing the statement to automatically close; and the box lid of the key/keycard box from the micro-controller unit.

2. The issuing and storing key/keycard system according to claim 1, wherein the cloud server also includes a data center used in storing the information of the customer/user of the whole system;

wherein the data center includes a biometric data center, identification user rights/owner of key/keycard data center, and departure data center of the customer/user;

wherein the Web/App management application also includes the synchronized data statement to the cabinet control server, and the synchronized data includes identification user rights/owner of key/keycard data center and departure data center;

wherein the Web/App management application also includes the verifying user rights/owner of key/keycard statement is sent to the cabinet control server reply to biometric data center if the verifying user rights/owner of key/keycard statement is the requested statement by biometrics including the face, retina/iris, and fingerprint.

3. The issuing and storing key/keycard system according to claim 1, wherein the issuing and storing key/keycard cabinet further comprising a first power supply, a screen, a mechanical keyboard, and a biometric identification module;

wherein the first power supply is used in electrically connecting to the key/keycard drawer, the screen, the mechanical keyboard, and the biometric identification unit;

wherein the screen, the mechanical keyboard, and the biometric identification unit are used in receiving the verification information user rights/owner of the key/keycard from the customer/user; the identifying information is transmitted to the cabinet control server through the local connection channel;

wherein the cabinet control server will identify information of the user rights/owner of key/keycard to send statements to open the key/keycard drawer through the local network channel;

wherein the local connection channel includes electrical connection and/or magnetic connection, and/or mechanical connection.

4. The issuing and storing key/keycard system according to claim 1, wherein the key/keycard drawer further comprising a a mechanical locking unit, a security unit, an auxiliary equipment unit, and a control circuit; all of them are connected by the local connection channel;

wherein the control circuit includes a microcontroller unit, an RFID card reader circuit, and a transmission protocol port;

wherein the RFID card reader circuit used in the microcontroller unit reading identifying information user rights/owner of the key/keycard owner authentication unit;

wherein the transmission protocol port is used in connected the issuing and storing key/keycard cabinet to the cabinet control server through the local network channel;

wherein the micro-controller unit sends a statement controlling the mechanical locking unit, the key/keycard owner authentication unit, the security unit, and the auxiliary equipment unit through the local connection channel; the difference is that the micro-controller unit also records response from the security unit and the auxiliary equipment unit for to send a warning message/notification message to the control server;

wherein the mechanical locking unit are mechanical key devices used in opening/closing the key/keycard box including stainless-steel deadbolts, an electric motor, and an electromagnetic lock;

wherein the security unit includes devices including cameras, sensors, and/or IoT devices used for recording and notifying opening/closing status of the key/keycard box or illegal activities;

wherein the auxiliary equipment unit are devices handling states related to the surroundings including lights, and pressure sensors.

5. The issuing and storing of key/keycard according to claim 1, wherein the cabinet control server includes a data storage, and a key/keycard management module;

wherein the data storage includes a key/keycard owner's identification data, and a departure data;

wherein the key/keycard management module includes an identifying owner of the key/keycard module, a security warning module, a setting transmission protocol module, and the module synchronizing data to the cloud server;

wherein the identifying owner of the key/keycard module receives information about the customer/user from the screen or the mechanical keyboard or the biometric identification unit at the I/O interface to communicate with peripherals including camera, and camera 3D;

wherein the received information includes biometric information including face or fingerprint; the received information also includes email/phone number and password or reservation code or QR code or combining two or more of these authentication factors for to create two-factor authentication or three-factor authentication;

wherein the second security warning module will send a warning sound statement to the audio interface in case the identifying information owner of the key/keycard is incorrect, or there is unauthorized access to the issuing and storing key/keycard;

wherein the module synchronizing data to the cloud server is used in synchronizing partial or full from the cabinet control server to the cloud server; data synchronization includes the key/keycard owner's identification data, the departure data of the cabinet control server with the key/keycard owner's identification data center, the departure data center of the cloud server.

6. The issuing and storing key/keycard system according to claim 1, wherein the issuing and storing key/keycard cabinet further comprising a frame rack used in mechanically connecting to the first power supply, the screen, the mechanical keyboard, and the key/keycard drawers.

7. The issuing and storing key/keycard system according to claim 4, wherein the control circuit is mechanically mounted on the back of the frame holder; wherein the control circuit includes a printed circuit board.

8. The issuing and storing key/keycard system according to claim 1, wherein the box lid and the frame holder are made of metal conductive material.

9. The issuing and storing key/keycard system according to claim 1, wherein the box lid and the frame holder are also made of a non-metal conductive material including synthetic resins;

wherein the box lid also includes adding an instruction manual board at the outside of the panel;

wherein the instruction manual board is made of metal conductive material; wherein the internal box lid also includes two pieces of flat metal and a sliding tray;

wherein the two pieces of flat metal mechanically connect along the body of the box lid to prevent hacking from the security unit.

10. The issuing and storing key/keycard system according to claim 1, wherein the key/keycard box further comprising an electric motor of the mechanical locking unit;

wherein the electric motor is mechanically connected to the frame holder, the link rod, and electrically linked to the control circuit;

wherein the electric motor operates according to the statement from the micro-controller unit to open/close the box lid of the key/keycard box through the link rod and the drive shaft;

wherein the engine configuration includes electric motor, speed reduction box, lead screw rod, clutch unit, and transmission gear; all of them are mechanically connected;

the clutch unit includes driving gear and driven gear;

wherein the driven gear fixed mount to the link rod and the driving gear fixed mount to the center of transmission gear;

wherein the electric motor will drive the speed reduction box to rotate the lead screw rod to drive the transmission gear;

wherein the transmission gear will push/separate (clutch) the driving gear and the driven gear to perform the box lid opening/closing operation through the link rod and the drive shaft.

11. The issuing and storing key/keycard system according to claim 1, wherein the issuing and storing key/keycard cabinet is also used in storing the other personal belongings.

12. Method of issuing and storing key/keycard includes steps:

i) providing the issuing and storing key/keycard includes: a network, a cloud server, a cabinet control server, and at least an issuing and storing key/keycard cabinet;

wherein the cloud server, the terminal, and the cabinet control server are connected to the network through the internet communication channel;

wherein the issuing and storing key/keycard cabinet is connected to the cabinet control server through the local network channel;

wherein the issuing and storing key/keycard cabinet includes a first power supply, a screen, a mechanical keyboard, a biometric identification unit, and a key/keycard drawers;

wherein the key/keycard drawer includes a key/keycard box, a mechanical locking unit, a key/keycard owner authentication unit, a security unit, a auxiliary equipment unit, and a control circuit; all of them are connected by the local connection channel;

wherein the key/keycard box has a shape rectangular/square and includes a box lid, a frame holder, a light supply, and two deadbolts;

wherein the box lid, the light supply, and the deadbolts are mechanically connected to the frame holder;

wherein the light supply and the deadbolt are electrically connected to the control circuit;

wherein the light supply belongs to the auxiliary equipment unit and the deadbolt belongs to the mechanical locking unit;

wherein the internal box lid, the opposite of the deadbolt, also includes adding two tumblers have shape hook up; at the first position on the two tumblers are attached a first permanent magnet and a second permanent magnet;

wherein the deadbolt is used to protect the tumbler from being hacked/infiltrated by an external agent; in addition, the deadbolt is also used to hold/release the tumbler, used for opening/closing the box lid; the difference is the microcontroller of the control circuit will request the deadbolt to release the tumbler to open the box lid;

wherein the internal box lid, at the bottom position, also includes adding a drive shaft used in mechanically linking with the frame holder at a link rod of the frame holder; wherein the sliding tray is used in storing the key/keycard owner authentication unit; the difference is the sliding tray has a U shape, hollow inside to facilitate the operation of taking/storing the RFID tag card to the sliding tray;

wherein the frame holder also includes adding a key/keycard rack, two keyholes, and a link rod;

wherein the key/keycard rack is used in hanging/hooking the key/keycard, the keyhole is used to create a link between the tumbler and the deadbolt;

wherein the link rod is mechanically connected to the box lid, the frame holder, and the engine configuration belongs to the mechanical locking unit;

wherein the engine configuration operates according to the statement from the micro-controller unit to open/close the box lid of the key/keycard box through the link rod and the drive shaft;

wherein the below of the frame holder, the opposite of the drive shaft of the box lid, has two defect angles to limit an opening angle a between the box lid and the frame holder; where a is a real number greater than 0 (zero);

wherein the internal key/keycard box also includes adding a magnetic sensor, and a third permanent magnet belongs to the mechanical locking unit;

wherein the magnetic sensor is used in detecting the magnetic field of the second permanent magnet and used in executing the statement to automatically close the box lid of the key/keycard box from the micro-controller unit;

wherein the local connection channel includes electrical connection and/or magnetic connection, and/or mechanical connection;

wherein the cabinet control server includes a data storage and a key/keycard management module;

wherein the data storage includes a key/keycard owner's identification data and a departure data;

wherein the key/keycard management module includes an identifying owner of the key/keycard module, a security warning module, a setting transmission protocol module, and the module synchronizing data to the cloud server;

wherein the cloud server includes the data center used to store the information of the customer/user of the entire the issuing and storing key/keycard system, the Web/App management application;

wherein the data center includes a biometric data center, identification user rights/owner of key/keycard data center, and departure data center;

ii) perform registration/authentication of user rights/owner key/keycard: specifically, the customer/user, through the terminal, can send information to the cloud server requesting permission to user rights/owner key/keycard by logging in to a website or through software applications with an user interface (UI) installed on the customer/user's terminal;

wherein the customer/user's information needs to provide to authenticate the user rights/owner of the key/keycard, including the phone number and/or email address associated with the password and/or other online biometrics information, including face shots from multiple angles;

iii) check whether the registration/authentication step is successful or not: if the registration/verifying user rights/owner of key/keycard is successful, proceed to step iv); otherwise, the key/keycard issuance process ends;

iv) the cloud server synchronizes data with the cabinet control server; wherein the synchronized data includes the identification of user rights/owner of key/keycard data and departure data center;

v) the customer/user receives the user rights/owner of key/keycard authentication information via terminal;

wherein the user rights/owner of key/keycard authentication information includes methods used to authenticate user rights/owner of key/keycard, advice instructions via short message service (SMS) and/or email, and/or user interface (UI) via a network;

wherein the authentication information of the user rights/owner of key/keycard is also encrypted in the form of a QR code (Quick Response code);

vi) the customer/user takes/stores key/keycards at the issuing and storing key/keycard cabinet by authentication methods;

wherein authentication methods are performed by the customer/user at the screen, the mechanical keyboard, and/or biometric identification module;

wherein the verification information user rights/owner of key/keycard is provided from one of the authentication methods, and then, through the local connection channel, the identifying owner of key/keycard module at the cabinet control server checks and authenticates the user rights/owner of key/keycard based on the key/keycard owner's identification data;

wherein the checking and verifying user rights/owner of key/keycard in the identifying owner of key/keycard module also includes the connection to the data center of the cloud server;

vii) check whether the verifying user rights/owner of key/keycard in step vi) is successful: if successful, proceed to step viii) otherwise, go back to step iv) or end the method issuing and storing key/keycard;

viii) consider that the requested statement after the authentication step vi) is the statement to receive/keep the key/keycard: if it is the command requesting the storage of the key/keycard, perform step ix); otherwise, do step x);

ix) perform a query on which the key/keycard drawer is in a state where the key/keycard is not stored;

where, step ix) will be queried/recorded by the key/keycard drawer status from the key/keycard drawer status data;

x) opening the box lid so that the customer/user can receive/store the key/keycard;

wherein the cabinet control server, mainly the identifying owner of the key/keycard module, requested the micro-controller unit, through the local network channel and the mechanical locking unit, to open the box lid;

wherein the mechanical locking unit includes the deadbolt and the engine configuration;

wherein step x) also includes the auxiliary equipment unit: the micro-controller unit, through the local connection channel, executes a statement to turn on the light supply and/or alarm bell/security alarm to the customer/user conveniently receive/store keys/keycards;

wherein, randomly, the key/keycard drawer is selected;

wherein step x) also includes the operation of the security unit: specifically, through the magnetic sensor that does not recognize the presence of the second permanent magnet because the box lid opened, the micro-controller unit measures a time threshold X to close the box lid automatically;

wherein the time threshold X is the time interval for which the box lid is opened, and X is a real number greater than 0 (zero) and is expressed in seconds (s);

xi) check whether the box lid opening time exceeds the previously established time threshold X: if the box lid opening time exceeds the time threshold X, perform step xii); otherwise, perform step xiii);

xii) perform automatic closing of the box lid;

wherein the micro-controller unit performs step xii) by requesting the mechanical locking unit to close the box lid; precisely, through the local connection channel, the micro-controller unit controls the engine configuration firmly into the deadbolt;

xiii) the key/keycard drawer sends information recording the state of the key/keycard box to the cabinet control server: specifically, the micro-controller unit, through the local network channel, sends the information to the cabinet control server to the key/keycard box status module performs storage recording to status data of key/keycard box;

wherein the status of key/keycard box includes the status of whether/without storing keys/keycards and/or the status of unauthorized access to the issuing and storing key/keycard cabinet;

xiv) the cabinet control server executes the data synchronization statement with the cloud server;

wherein the data synchronization module performs the data synchronization statement with the cloud server;

wherein the data storage of the cabinet control server that synchronized, including the key/keycard owner's identification data, the departure data, and the cloud server data, including the key/keycard owner's identification data center, the departure data center.

13. The method of issuing and storing key/keycard according to claim 12, wherein authentication methods to verify user rights/owner of key/keycard include:

authentication using biometrics, including the face and fingerprint;

authentication using QR code;

authentication using hotel/restaurant reservation code;

authentication using an email address/mobile number combine with a password;

authentication using a third-party account;

wherein the authentication method also includes combining two or more of these authentication factors for to create two-factor authentication or three factor authentication.

14. The method of issuing and storing key/keycard according to claim 12, wherein the key/keycard owner authentication unit includes the mechanical key with an RFID tag card, the mechanical key and the RFID tag card, the magnetic RFID tag card.

15. The method of issuing and storing key/keycard according to claim 12, wherein the control circuit is mechanically mounted on the back of the frame holder; wherein the control circuit includes a printed circuit board.

16. The method of issuing and storing key/keycard according to claim 12, wherein the box lid and the frame holder are made of metal conductive material.

17. The method of issuing and storing key/keycard according to claim 12, wherein the box lid and the frame holder are also made of a non-metal conductive material comprising synthetic resins;

wherein the box lid also includes adding an instruction manual board at the outside of the panel;

wherein the instruction manual board is made of metal conductive material;

wherein the internal box lid also includes two pieces of flat metal and a sliding tray;

wherein the two pieces of flat metal mechanically connect along the body of the box lid to prevent hacking from the security unit.

18. The method of issuing and storing key/keycard according to claim 12, wherein the engine configuration includes electric motor, speed reduction box, lead screw rod, clutch unit, and transmission gear; all of them are mechanically connected;

the clutch unit includes driving gear and driven gear;

wherein the driven gear fixed mount to the link rod and the driving gear fixed mount to the center of transmission gear;

wherein the electric motor will drive the speed reduction box to rotate the lead screw rod to drive the transmission gear;

wherein the transmission gear will push/separate (clutch) the driving gear and the driven gear to perform the box lid opening/closing operation through the link rod and the drive shaft.

19. The method of issuing and storing key/keycard according to claim 12, wherein the issuing and storing key/keycard cabinet is also used in storing the other personal belongings.

* * * * *